United States Patent
Yoshikawa et al.

(10) Patent No.: US 7,440,843 B2
(45) Date of Patent: Oct. 21, 2008

(54) CAR TRAFFIC INFORMATION NOTIFICATION SYSTEM, CAR TRAFFIC INFORMATION NOTIFICATION METHOD, AND NAVIGATION SYSTEM

(75) Inventors: Kazutaka Yoshikawa, Okazaki (JP); Kenji Nagase, Okazaki (JP); Hiroki Ishikawa, Okazaki (JP); Tomoyuki Zaitsu, Okazaki (JP); Daisuke Doi, Nagoya (JP)

(73) Assignee: Aisin AW Co., Ltd., Anjo (JP)

( * ) Notice: Subject to any disclaimer, the term of this patent is extended or adjusted under 35 U.S.C. 154(b) by 748 days.

(21) Appl. No.: 10/875,915

(22) Filed: Jun. 25, 2004

(65) Prior Publication Data

US 2005/0027436 A1  Feb. 3, 2005

(30) Foreign Application Priority Data

Jul. 29, 2003  (JP)  ............................. 2003-203260

(51) Int. Cl.
*G01C 21/34* (2006.01)
*G08G 1/0967* (2006.01)

(52) U.S. Cl. ....................................... 701/117; 701/211
(58) Field of Classification Search ........................ None
See application file for complete search history.

(56) References Cited

U.S. PATENT DOCUMENTS

| 5,406,490 | A | | 4/1995 | Braegas | |
|---|---|---|---|---|---|
| 5,635,924 | A | * | 6/1997 | Tran et al. | 340/905 |
| 5,774,827 | A | * | 6/1998 | Smith et al. | 701/209 |
| 5,850,190 | A | * | 12/1998 | Wicks et al. | 340/905 |
| 6,253,146 | B1 | * | 6/2001 | Hanson et al. | 701/202 |
| 6,401,027 | B1 | * | 6/2002 | Xu et al. | 701/117 |
| 6,591,188 | B1 | * | 7/2003 | Ohler | 701/209 |
| 6,741,926 | B1 | * | 5/2004 | Zhao et al. | 701/201 |
| 6,859,720 | B2 | * | 2/2005 | Satoh et al. | 701/117 |
| 2001/0029425 | A1 | * | 10/2001 | Myr | 701/200 |
| 2003/0033077 | A1 | * | 2/2003 | Watanabe | 701/117 |
| 2003/0055558 | A1 | | 3/2003 | Watanabe et al. | |
| 2004/0068364 | A1 | * | 4/2004 | Zhao et al. | 701/201 |

FOREIGN PATENT DOCUMENTS

| EP | 0 967 460 A1 | 12/1999 |
|---|---|---|
| JP | A-09-089579 | 4/1997 |
| JP | A-11-134407 | 5/1999 |
| JP | A-11-134594 | 5/1999 |
| JP | A-2000-028376 | 1/2000 |
| JP | A-2003-203296 | 7/2003 |

* cited by examiner

*Primary Examiner*—Michael J. Zanelli
(74) *Attorney, Agent, or Firm*—Oliff & Berridge, PLC

(57) ABSTRACT

A traffic information notification system for use by a vehicle acquires vehicle travel history data, automatically registers, on the basis of the acquired travel history data, at least one route along which the vehicle usually travels, a time at which the vehicle travels along each of the at least one routes, and traffic information associated with each of the at least one routes. The traffic information system compares current traffic information along a registered route to be traveled provided by a traffic information system with the automatically registered traffic information for that registered route to be traveled, and provides a notification, when the current traffic information is substantially different from the automatically registered traffic information, of the substantially different current traffic information.

16 Claims, 15 Drawing Sheets

CAR TRAFFIC INFORMATION NOTIFICATION SYSTEM, CAR TRAFFIC INFORMATION NOTIFICATION METHOD, AND NAVIGATION SYSTEM

INCORPORATION BY REFERENCE

The disclosure of Japanese Patent Application No. 2003-203260 filed Jul. 29, 2003 including the specification, drawings and claims is incorporated herein by reference in its entirety.

BACKGROUND OF THE INVENTION

1. Field of Invention

The present invention relates to a traffic information notification system for use by a vehicle and a navigation system.

2. Description of Related Art

One known system relating to technology of navigation systems is the travel plan management system disclosed in Japanese Unexamined Patent Application Publication No. 11-134407. In this travel plan management system, if a travel plan including a starting point, a destination point, and a planned arrival time is input to a navigation apparatus, the travel plan is transmitted to an information center. In accordance with the received travel plan, the information center searches for an optimum route from the starting point to the destination point and calculates the time required for a car to travel along the optimum route. The detected optimum route and the calculated required time are registered in the information center and data indicating the optimum route and the required time is transmitted to the navigation apparatus. In response to receiving the data, the navigation apparatus displays the optimum route and the required time.

If an event occurs at a location along the optimum route, the occurrence of that event can cause traffic congestion. The traffic congestion can cause a problem in the planned travel. If such an event occurs, an optimum route is re-searched and data associated with the re-searched optimum route is transmitted to the navigation apparatus.

In a car navigation system using a travel plan management system according to the above-described technique, if a user of the navigation system specifies a navigation route, the specified route is registered. When traffic congestion occurs on the registered route, the user is informed of the occurrence of traffic congestion.

However, in order to specify a navigation route to be registered, the user has to perform a troublesome manual operation to input data specifying the navigation route to the navigation system.

A notification of an occurrence of traffic congestion is issued each time traffic congestion occurs. If traffic congestion occurs frequently on a registered navigation route, frequent notifications of occurrences of traffic congestion can bother a user.

SUMMARY OF THE INVENTION

Thus, various exemplary embodiments of this invention provide a traffic information notification system for use in a vehicle that utilizes a car navigation system and/or a traffic information notification system. The traffic information notification system has the capability of automatically registering a navigation route and the capability of, when an unusual current traffic condition on the registered navigation route is detected, notifying of the unusual traffic condition.

Various exemplary embodiments of the invention provide a traffic information notification system for use by a vehicle including at least one controller that acquires vehicle travel history data, automatically registers, on the basis of the acquired travel history data, at least one route along which the vehicle usually travels, a time at which the vehicle travels along each of the at least one routes, and traffic information associated with each of the at least one routes, and compares current traffic information along a registered route to be traveled provided by a traffic information system with the automatically registered traffic information for that registered route to be traveled. The at least one controller provides a notification, when the current traffic information is substantially different from the automatically registered traffic information, of the substantially different current traffic information provided by the traffic information system Various exemplary embodiments of the invention provide a traffic information notification system for use by a vehicle comprising including a first at least one controller, disposed on the vehicle, that acquires vehicle travel history data, receives registered route data that is transmitted from a transmitter disposed separately from the vehicle, the registered route data including data indicating, a time at which the car travels along the route, and usual traffic information on the route, provides a notification, when current traffic information provided by a traffic information system is substantially different from the usual traffic information, of the substantially different traffic information together with data indicating a point on the registered route at which an unusual traffic condition indicated by the substantially different traffic information occurs. The traffic information includes a second at least one controller, disposed separately from the vehicle, that receives the travel history data, the travel history data being sequentially transmitted from the first at least one controller.

Various exemplary embodiments of the invention further provide a portable terminal wherein, if the vehicle is at a usual destination point and the stored current traffic information is substantially different from the usual traffic information, the second at least one controller notifies the portable terminal, of the substantially different stored traffic information together with data indicating a point on the registered route at which an unusual traffic condition indicated by the stored substantially different traffic information occurs, the second at least one controller searches for an alternative route different from the registered route, and when an alternative route is detected, the transmitter transmits data indicating the alternative route to the at least one first controller.

Various exemplary embodiments of the invention provide A method for providing traffic notification, including acquiring vehicle travel history data, automatically registering, on the basis of the acquired travel history data, at least one route along which the vehicle usually travels, a time at which the vehicle travels along each of the at least one routes, and traffic information associated with each of the at least one routes, comparing current traffic information along a registered route to be traveled provided by a traffic information system with the automatically registered traffic information for that registered route to be traveled, and providing a notification, when the current traffic information is substantially different from the automatically registered traffic information, of the substantially different current traffic information provided by the traffic information system.

BRIEF DESCRIPTION OF THE DRAWINGS

Exemplary embodiments of the invention will now be described with reference to the accompanying drawings, wherein.

DETAILED DESCRIPTION OF EXEMPLARY EMBODIMENTS

I. First Exemplary Embodiment

Figure 1:
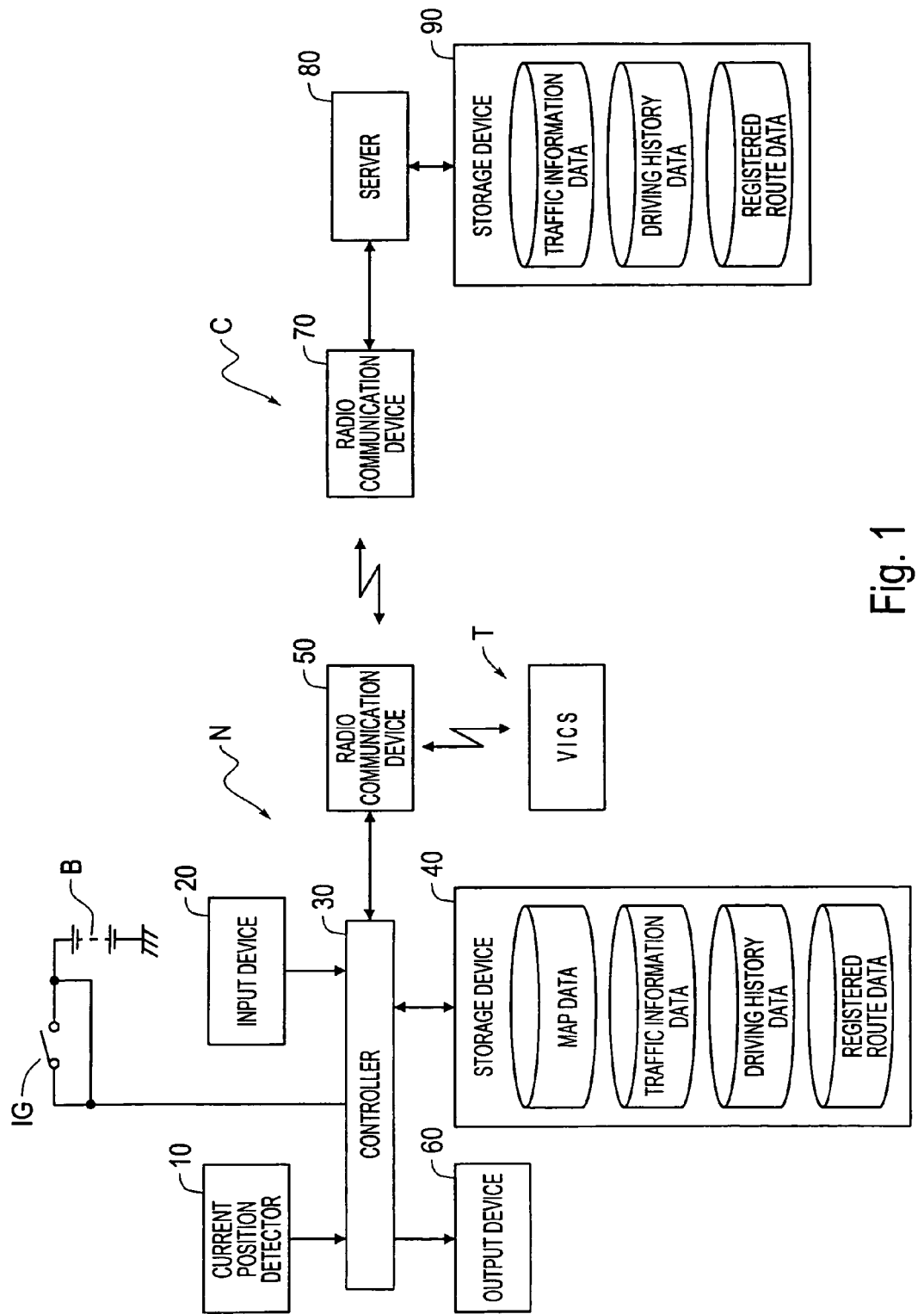
FIG. 1 is a block diagram showing a first exemplary embodiment of the invention.

FIG. 1 shows a vehicle navigation system N according to a first exemplary embodiment of the invention. The navigation system N includes a current position detector 10 that may use, for example, a GPS receiver that receives a radio wave transmitted from an artificial satellite in a satellite navigation system (also called a global positioning system (GPS)) and that can detect a current position of a vehicle and a current date and time.

The navigation system N also includes an input device 20 such as, for example, a portable remote controller. By operating the remote controller, it is possible to transmit necessary information to a controller 30 (that will be described later) via a receiving unit (not shown) of the controller 30. Instead of the remote controller, a touch panel disposed on the surface of a display panel of a display of an output device 60 (which will be described later) may be used as the input device 20. The receiving unit does not necessarily need to be disposed in the controller 30 but may be disposed outside the controller 30.

The navigation system N includes the controller 30, a storage device 40, a radio communication device 50, and the output device 60. The controller 30 is capable of executing a navigation method such as the exemplary method represented in the flow chart shown in FIGS. 2 and 3. By executing the navigation method, various operations including displaying of information on the output device 60 and providing navigation/guidance of a route along which a vehicle should travel, in accordance with detection of an operation of an ignition switch IG may be performed. Furthermore, by executing the navigation method, various operations may be performed including receiving data on the input device 20, data output from the storage device 40, data supplied from the radio communication device 50, and data supplied from a Vehicle Information and Communication System (vics) T.

The controller 30 may also execute an interrupt handling method such as those according to flow charts shown in FIGS. 4 to 7 in order to acquire travel history information associated with the car and acquire traffic information from the Vehicle Information and Communication System T. According to the exemplary interrupt handling method shown in FIGS. 4 to 7 the controller may also execute a car navigation route registration/update operation and a traffic condition registration/update operation. The interrupt handling method may be stored together with the navigation program in a ROM of the controller 30 in a form readable by the controller 30.

In the first exemplary embodiment, the controller 30 operates with electric power directly supplied from a battery B installed on the car. When electric power is supplied and the controller 30 is activated, the controller 30 may execute the navigation method described above. The controller 30 may also start execution of the interrupt handling method each time a predetermined interrupt timeout value (hereinafter referred to as a first interrupt timeout value set in the navigation system) set in an interrupt timer (hereinafter, referred to as a first interrupt timer in the navigation system) is reached.

The first interrupt timer of the navigation system N may be disposed in the controller 30. In response to a reset/start command, the first interrupt timer of the navigation system N starts to count down the first interrupt timeout set in the navigation system N. The first interrupt timeout value of the navigation system N is set to, for example, 12 hours.

A hard disk may be used as the storage device 40. Data may be stored in the form of a database on the storage device 40. Examples of data stored in the database include map data, traffic information data, travel history data, and registered route data. The registered route data can include data indicating a route, a time required to travel along the route, a traffic condition on the route, a typical time required to travel various predetermined portions of a route, a typical vehicle speed across various predetermined portions of a route, and/or other traffic information.

The radio communication device 50 can receive traffic information transmitted from the Vehicle Information and Communication System T and transfer the received traffic information to the controller 30. The Vehicle Information and Communication System T transmits traffic information traffic conditions such as the degree of traffic congestion, traffic closures, traffic restrictions, expected travel times for various predetermined portions of a route, and/or expected average vehicle speeds across various predetermined portions of a route.

A display may be used as the output device 60. Under the control of the controller 30, various kinds of information necessary for driving the vehicle are displayed on, for example, a display panel of the output device 60.

An information center C communicates with the navigation system N. The information center C may include a radio communication device 70, a server 80, and a storage device 90. The radio communication device 70 can transmit and receive data to and from the radio communication device 50 of the navigation system N. The storage device 90 may be used to store, for example, traffic information data, driving distance data, and/or registered route data. The registered route data refers to, for example, data indicating a route, a time required to travel along the route, traffic condition along the route, a typical time required to travel various predetermined portions of a route, a typical vehicle speed across various predetermined portions of a route, and/or other traffic information. The server 80 can execute, for example, the exemplary server method in accordance with a flow chart shown in FIG. 8. In the execution of the exemplary server method, data received via the radio communication device 70 may be stored in the storage device 90.

Figure 2:
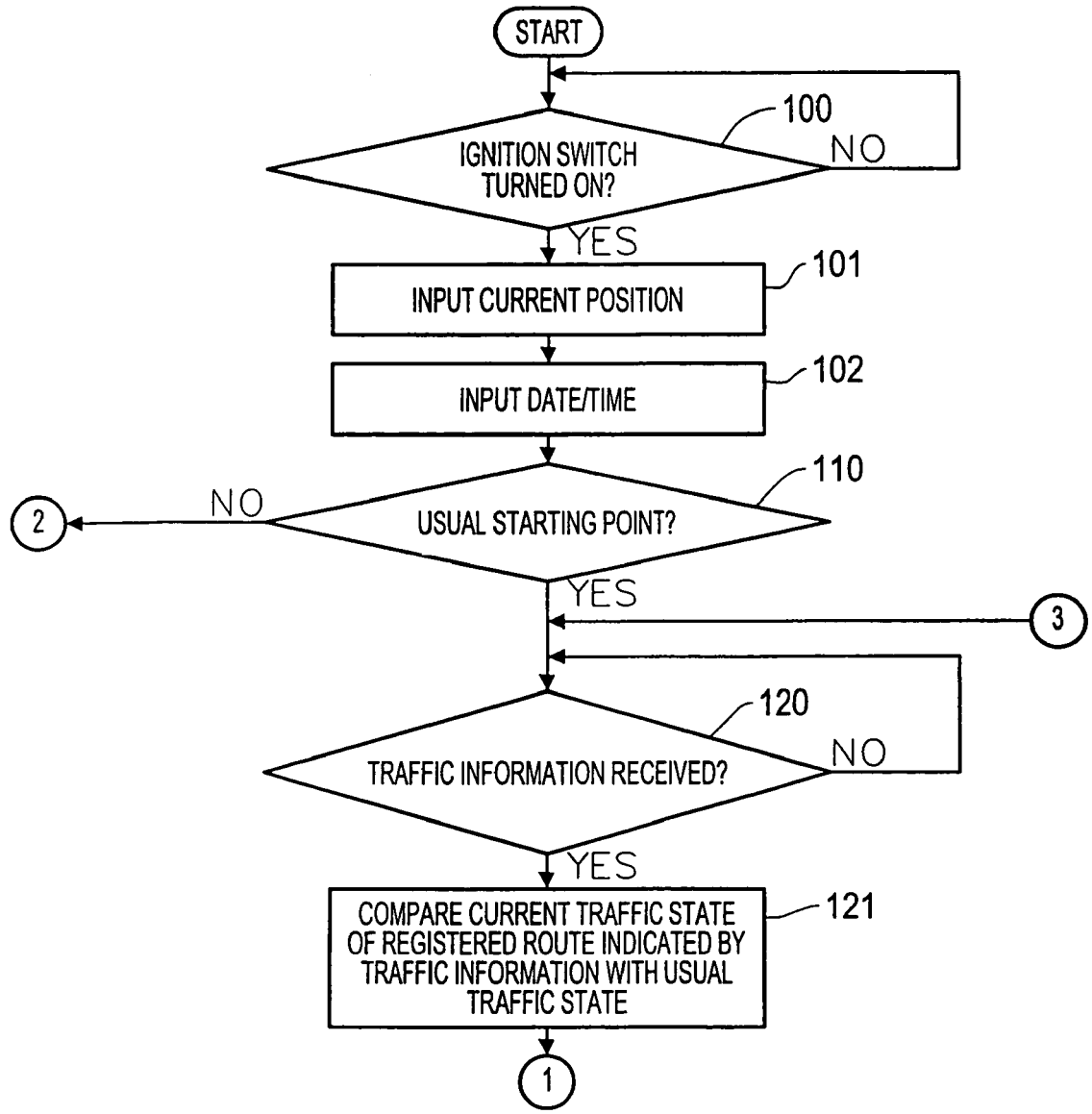
FIG. 2 is a flow chart showing an example of a first part of a navigation method that may be executed by the controller shown in FIG. 1.
Figure 3:
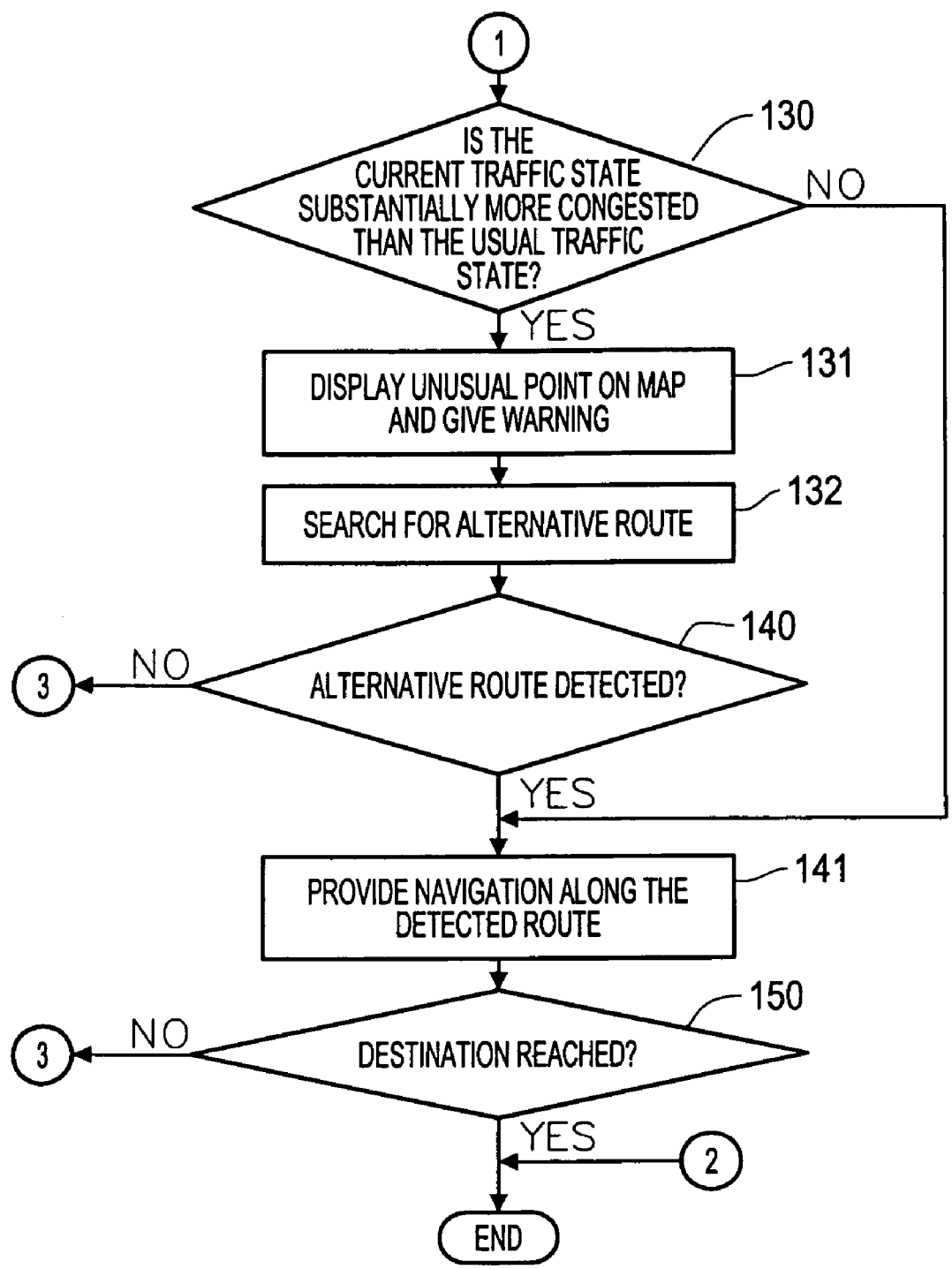
FIG. 3 is a flow chart showing an example of a second part of the navigation method of FIG. 2.
Figure 4:
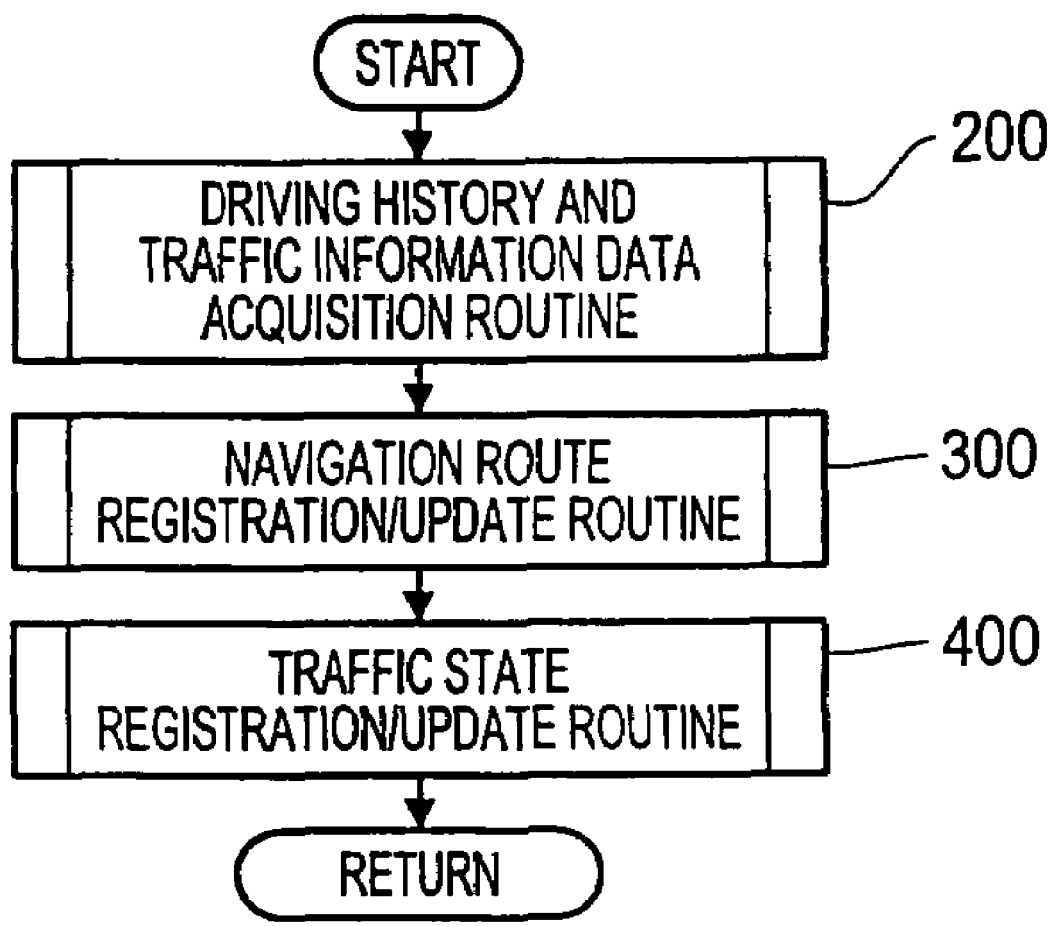
FIG. 4 is a flow chart showing an example of an interrupt handling program method that may be executed by the controller shown in FIG. 1.
Figure 5:
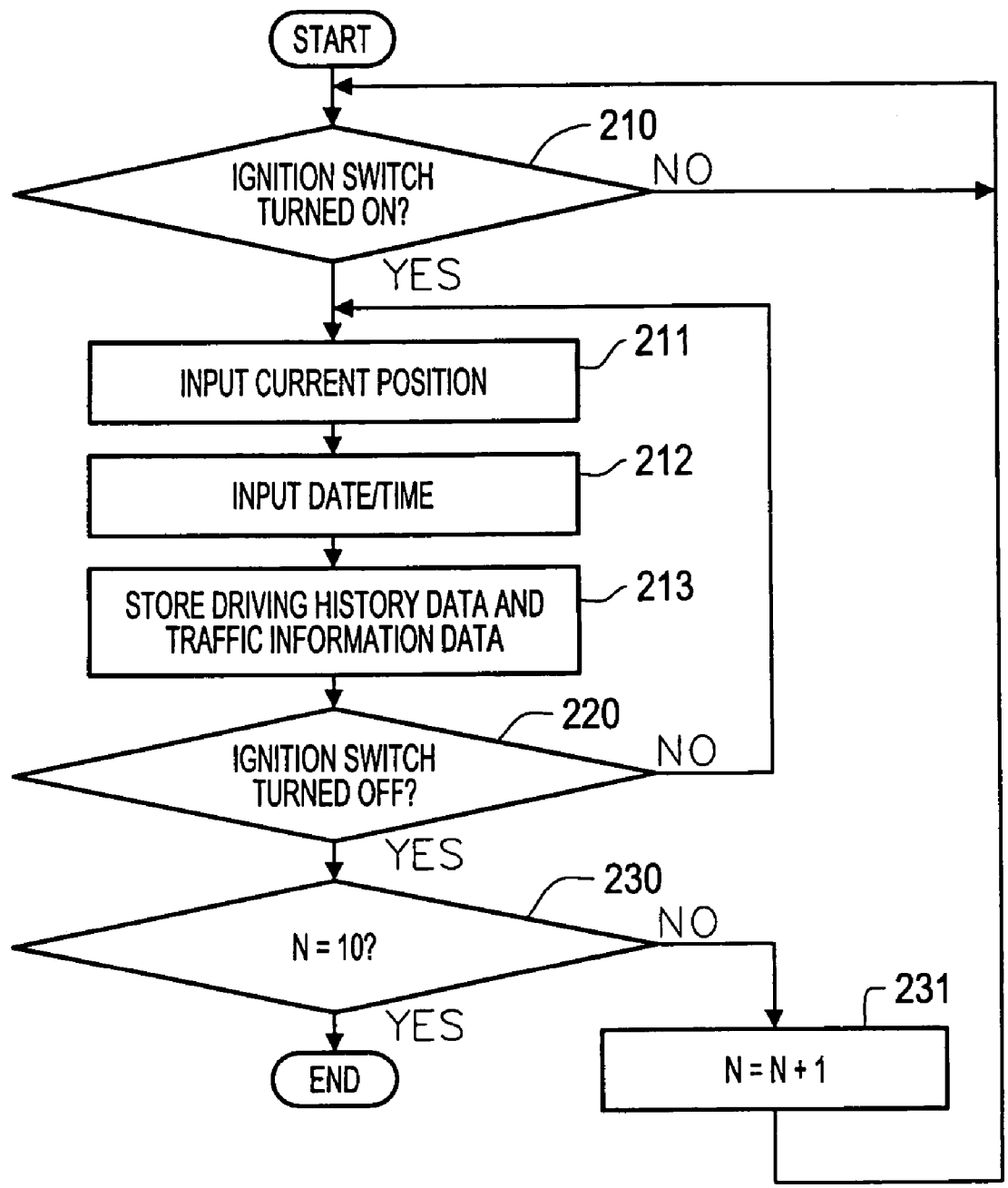
FIG. 5 is a flow chart showing details of the exemplary data acquisition method, shown in FIG. 4, for acquiring data associated with travel history and traffic information.

According to the first exemplary embodiment configured in the above-described manner, with electric power directly supplied from the battery B, the controller 30 can execute, for example, the exemplary navigation method shown in the flow charts of FIGS. 2 and 3. If the ignition switch IG is in an off-state, step 100 is performed repeatedly, and a negative decision is made each time step 100 is performed.

If the ignition switch IG is turned on, an affirmative decision is made in step 100. Meanwhile, at the information center C, the server 80 repeatedly executes the exemplary server method according to the flow chart shown in FIG. 8.

If an affirmative decision is made in step 100, then in steps 101 and 102, the current position of the car and the current date/time are acquired from a detection signal output from the current position detector 10. In step 110, it is determined whether the current position is a usual starting point (a point from which the car usually starts) on the basis of the detection signal output from the current position detector 10. Herein, the "usual starting point" refers to a point that has been specified as a starting point very often, that is, a point that has been specified as a starting point a predetermined number of times or more. Specific examples of "usual starting points" are a user's home, a user's place of business, and/or a user's school.

If the current position of the car is a usual starting point, an affirmative decision is made in step 110. This means that it is likely that the car is going to run along a usual route. Herein, the "usual route" refers to a route along which the car has run very often, that is, a route along which the car has run a predetermined number of times or more. Specific examples of "usual routes" are a commute route from a user's home to a user's place of business or a commute route from a user's home to a user's school.

In this situation, if traffic information transmitted from the Vehicle Information and Communication System T is received by the radio communication device 50 and transferred to the controller 30, then in step 120, it is determined that traffic information has been received. That is, an affirmative decision is made in step 120. Then, in step 121, the current traffic condition on the registered route indicated by the received traffic information is compared with the typical traffic condition. That is, the current traffic information obtained is compared with typical traffic information (that is, most frequently occurring traffic information) on the registered usual route in terms of traffic condition.

In the above comparison, the controller 30 issues a request for typical traffic information to the storage device 40. In response, for example, the storage device 40 may read typical traffic information associated with the registered usual route from traffic information data recorded in the database and supplies the typical traffic information to the controller 30.

Figure 9A:
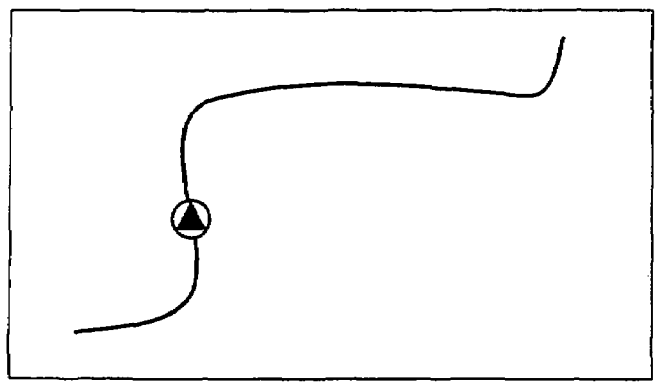
FIGS. 9A to 9D are diagrams showing examples of information displayed on a display according to the first exemplary embodiment.

In step 121 described above, on the basis of the traffic information obtained in the above-described manner, the comparison between the current traffic information on the registered route and the typical traffic information is made. If the current traffic information on the registered route is not substantially more congested than the typical traffic information, a negative decision is made in step 130 (FIG. 3). In this case, the operation jumps to step 141. In step 141, route navigation/guidance is provided along the registered route. In the route guidance/navigation, for example, a map including the navigation route is displayed on the output device 60 as shown in FIG. 9A so that the vehicle can run in a usual manner along the registered usual route.

On the other hand, in step 121, if the current traffic information on the registered route is substantially more congested than the typical traffic information, for example, at a point on the registered route along which the car usually travels, the current traffic information indicates that there is traffic congestion, but the typical traffic information indicates that usually there is no traffic congestion, then a positive decision is made in step 130. This means that unusual traffic congestion (indicated by the newly acquired traffic information) has occurred at the point on the registered route along which the car usually travels.

For example, in various exemplary embodiments of the invention, traffic conditions may be divided into three predetermined levels (e.g., congested, crowded, and light) based on the extent of the congestion. Accordingly, whenever the current traffic information indicates that the current traffic level is at least one level greater than the typical traffic information for a particular portion of the registered route, the traffic for that portion would be considered substantially more congested in step 121.

Similarly, in various other exemplary embodiments, the current traffic indicated by the current traffic information may be considered substantially more congested if a current travel time for a portion of the registered route included in the current traffic information is, for example, 30% greater than a typical travel time indicated in the typical traffic information.

In various other exemplary embodiments, the current traffic indicated by the current traffic information may be considered substantially more congested if a current average travel speed for a portion of the registered route included in the current traffic information is, for example, 30% greater than a typical average travel speed indicated in the typical traffic information.

Figure 9B:
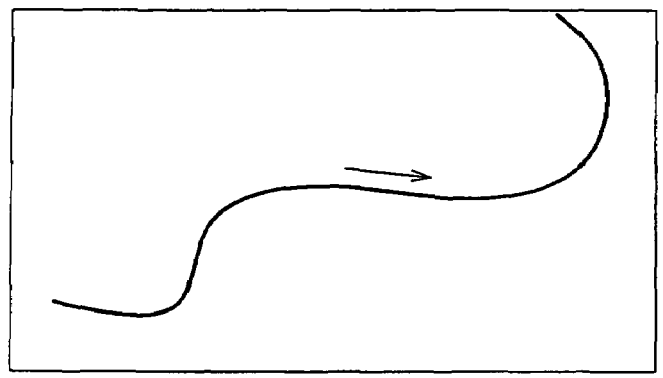

Returning to FIG. 2, in the case in which a positive decision is made in step 130, the process proceeds to step 131. In step 131, a map of the point where the detected unusual traffic condition is detected is displayed, and a warning is issued. For example, in this step 131, a map including the point where the unusual traffic condition occurs is displayed, as shown by way of example in FIG. 9B, on the output device 60, and the unusual traffic condition such as unusual traffic congestion indicated by the unusual traffic information is displayed. In the specific example shown in FIG. 9B, an arrow is displayed to indicate a point where an unusual traffic condition occurs and thereby giving a warning to a user.

As descried above, only when an unusual traffic condition such as unusual traffic congestion different from the typical traffic condition is detected on a usual route along which the vehicle runs, the affirmative decision is made in step 130 and the warning is displayed in step 131. In other words, no warning is issued when the traffic condition on the usual route is not unusual, but the warning is displayed only when an unusual traffic condition such as unusual traffic congestion occurs. Thus, the driver of the vehicle is not bothered by a warning that is issued whenever the car passes a particular point where congestion is common (usual) and to be expected by the driver.

The usual routes along which the vehicle runs may be automatically registered in the storage devices 40 and 90 as will be described in detail later. Therefore, the driver of the car does not need to perform a troublesome manual operation on the input device 20 to register the usual route.

After completion of step 131, an alternative route is searched for in step 132. In the alternative route search process, the controller 30 searches the database stored in the storage device 30 to determine whether an alternative route from the starting point to the destination point is registered in the database.

In a case in which an alternative registered route is searched for from the database stored in the storage device 90 of the information center C, the controller 30 transmits an alternative route search request to the information center C via the radio communication device 50. If the server 80 receives the request via the radio communication device 70, the database stored in the storage device 90 is searched for an alternative registered route. If an alternative route is detected, the server 80 reads data associated with the detected alternative route from the storage device 90 and transmits the data via the radio communication device 70. The data is received by the radio communication device 50 and supplied to the controller 30. On the other hand, if no registered alternative route is found in the database in either the storage device 30 or the storage device 90, the controller 30 searches for an alternative route in a normal route search mode.

Figure 9C:
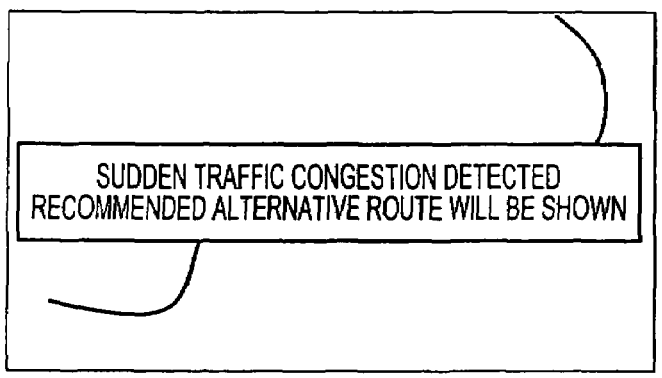
Figure 9D:
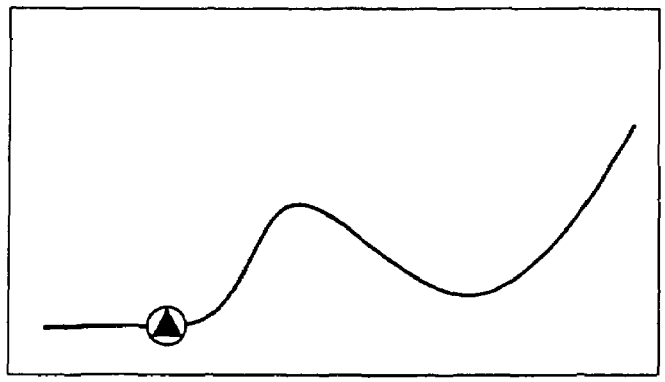

If an alternative route is detected, an affirmative decision is made in step 140, and the process proceeds to step 141. In step 141, route navigation/guidance for the car is provided along the detected route (registered usual route if negative decision in step 130 or alternative route if positive decision in step 140). If a detected alternative route is used, as shown in FIG. 9C, a message "Sudden traffic congestion is detected. Recommended alternative route will be shown." is displayed on the output device 60. Thereafter, as shown by way of example in FIG. 9D, a map including the detected alternative route is displayed on the output device 60. Thus, when unusual congestion occurs on the registered usual route, route guidance/navigation is provided along an alternative route determined in the above-described manner so that the car can travel toward the destination without encountering a problem.

In step 150, it is determined whether the vehicle has arrived at the destination, for example, on the basis of the detection signal output from the current position detector 10. If it is determined in step 150 that the car has arrived at the destination, the navigation method ends.

If it is determined in step 140 that no alternative route is found, or if it is determined in step 150 that the car has not yet arrived at the destination, that is, if a negative decision is made in step 140 or 150, the process returns to step 120 to repeat step 120 and following steps.

If the first interrupt timeout value set in the first interrupt timer of the navigation system N is reached, the controller 30 starts, for example, execution of the exemplary interrupt handling method in accordance with flow charts shown in FIGS. 4 to 7. First, in step 210 of the travel history/traffic information data acquisition method 200 shown in FIGS. 4 and 5, it is determined whether the ignition switch IG of the vehicle is turned on. If the ignition switch IG is in the on-state, an affirmative decision is made in step 210.

In steps 211 and 212, the current position of the vehicle and the current date/time are acquired from, for example, the detection signal output from the current position detector 10. In response, in step 213, travel history data of the vehicle and traffic information data are stored. Specifically, the travel history of the car (the current position input in step 211 and the date/time input in step 212) and traffic information acquired from the Vehicle Information and Communication System T are stored into the storage device 40.

Furthermore, in step 213, the travel history data and the traffic information data are transmitted. If the travel history data and the traffic information data are received by the server 80 of the information center C via the radio communication device 70, the server 80 makes an affirmative decision in step 500 in FIG. 8 and advances the process to step 510. In step 510, the server 80 stores the received travel history data and traffic information data into the storage device 90.

Returning to FIG. 5, after step 213, it is determined in step 220 whether the ignition switch IG is turned off. If it is determined in step 220 that the ignition switch IG is turned on, the loop from step 211 to step 220 is executed repeatedly until it is determined in step 220 that the ignition switch IG is turned off. In the execution of the above iteration loop, the travel history data and the traffic information data as at the car travels are stored, in step 213, into the storage devices 40 and 90.

If the ignition switch IG is turned off, the answer to step 220 becomes yes. In this case, operation of the method proceeds to step 230 and it is determined whether a parameter N=10. Note that the parameter N is reset to 0 when the travel history/traffic information data acquisition method 200 is started.

In this specific case, N=0 and thus the answer to step 230 is no. In the next step 231, the parameter N is incremented by 1. That is, the parameter is updated such that N=N+1=1. The process then returns to step 210 in which it is determined whether the ignition switch IG is in the on-state. In this specific case, because the ignition switch IG has been turned off, a negative decision is repeatedly made in step 210. If the ignition switch IG is again turned on, and the car again starts to run, an affirmative decision is made in step 210.

If the answer to step 210 becomes yes, the loop from step 211 to step 220 is repeatedly performed in a similar manner as described above until the ignition switch IG is turned off. In the execution of the above iteration loop, the travel history data and the traffic information data as of the period after the re-turning-on of the ignition switch IG are stored into the storage devices 40 and 90.

The loop from step 210 to step 231 is performed repeatedly until it is determined in step 231 that the parameter N=10. Thus, each time the ignition switch IG is turned on, the travel history data associated with the vehicle and the traffic information are stored in the storage devices 40 and 90.

After completion of the data acquisition method 200, a navigation route registration/update method 300 (FIGS. 4 and 6) is performed as follows. First, in step 310 in FIG. 6, statistical processing is performed on the travel history data. In this step, the travel history data accumulated in the storage device 40 is read into the controller 30 and subjected to statistical processing.

In a case in which the travel history data accumulated in the storage device 90 of the information center C is used in the statistical processing, the controller 30 transmits a travel history data request via the radio communication device 50. If the server 80 receives the request via the radio communication device 70, the server 80 reads the travel history data from the storage device 90 and transmits the data from the radio communication device 70. If the data is received by the radio communication device 50, the data is supplied to the controller 30 and subjected to the statistical processing.

Thereafter, in step 320, a route pattern extraction operation is performed. Specifically, patterns of routes are extracted from the statistically processed travel history data. Then in step 330, it is determined whether any of the extracted route patterns can be regarded as a usual route (e.g., frequently traveled). If no route described by the particular pattern cannot be regarded as a usual route along which the vehicle travels, the present pattern of routes is not subjected to further processing, and a negative decision is made in step 330.

If the one of the extracted route patterns can be regarded as a commute route, an affirmative decision is made in step 330, the process proceeds to step 340. In step 340, it is determined whether the pattern of routes includes a route substantially identical to a registered route. Specifically, the controller 30 reads registered route data from the storage device 40 and makes a comparison. For example, if one of the extracted route patterns is determined to be between the user's home and the user's place of business, and there is registered route between the user's home and the user's place of business, they may be considered substantially similar.

If registered route data stored in the storage device 90 of the information center C is used in the above determination, the controller 30 transmits a registered route data request from the radio communication device 50 to the server 80. If the request is received by the server 80 via the radio communication device 70, the server 80 reads registered route data from the storage device 90 and transmits the data via the radio communication device 70. The data is received by the radio communication device 50 and supplied to the controller 30.

It is then determined whether at least one of the registered routes in the registered route data read or supplied to the controller 30 in the above-described manner are substantially identical to at least one of the routes of the pattern of routes. If none of the registered routes are substantially identical to any of routes of the current route pattern, then a negative decision is made in step 340, and operation proceeds to step 341. In step 341, a new route registration process is performed. In this new route registration process, the detected route included in the pattern of routes regarded as the usual route is stored as a new route in the storage device 40. That is, the route of the pattern is registered as new registered route data in the storage device 40.

After completion of step 341, a registered route transmission process is performed in step 342. Specifically, in step 342, the controller 30 transmits the route as new registered route data via the radio communication device 50.

On the other hand, if it is determined in step 340 that the pattern of routes regarded as the usual route includes a route substantially identical to a registered route, that is, if the answer to step 340 is yes, then in step 350 it is determined whether the route pattern is identical to an existing registered route (i.e., does it follow the same route between the same locations). If the route pattern is identical to an existing registered route, the new route registration process is not necessary, and thus an affirmative decision is made in step 350.

If the route pattern is not identical to an existing registered route, the answer to step 350 is no, and the process proceeds to step 351. In step 351, a registered route change/addition process is performed. A change in the registered route can be caused, for example, by the user's place of business changing. Because the route pattern is between the user's home and the user's place of business, it is substantially the same as the original registered route. However, the physical location of the place of business, and thus route, have changed. Accordingly, in step 351 the new route would replace the old route. Alternatively, addition of a registered route is performed, for example, when another different route to the same destination is registered. For example, the user takes a different route (route pattern) to the same place of business. In this case it is beneficial for both the previously registered route and route pattern to be registered.

When the registered route is changed in step 351, an existing registered route in the registered route data stored in the storage device 40 is replaced with the route pattern and stored. In the case in which a route of a pattern is added as another additional route, the controller 30 stores the route of the pattern as another additional route into the storage device 40. That is, the route of the pattern is added to the registered route data and stored in the storage device 40. If at present no registered routes are stored in the storage device 40, the route pattern is simply registered as a usual route in the storage device 40.

After completion of step 351, a changed/added route data transmission process is performed in step 352. More specifically, the controller 30 transmits the route of the pattern as a changed or added registered route from the radio communication device 50.

If the route pattern data is transmitted in the transmission process in step 342 or step 352, as a new registered route data or a changed/added registered route data from the controller 30 via the radio communication device 50, the registered route data is received by the server 80 of the information center C via the radio communication device 70.

Figure 8:
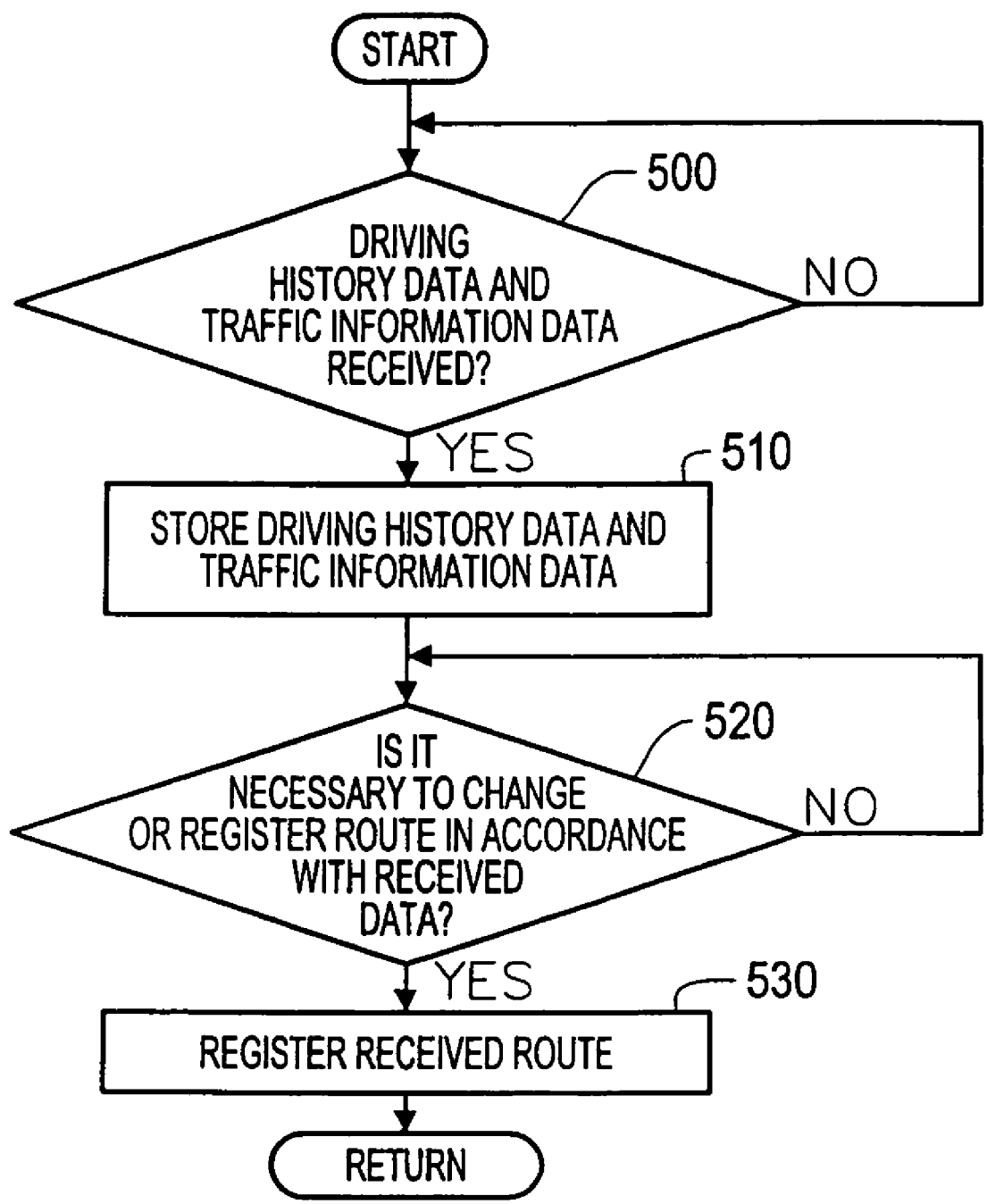
FIG. 8 is a flow chart showing an example of a server method that may be executed by the server shown in FIG. 1.

In step 520 in FIG. 8, an affirmative decision is made because in this specific case, a changed or added route is received. In the next step 530, registration is performed in accordance with the received data. That is, the route is stored as new registered route data or changed/added registered route data in the storage device 90. Thus, as described above, without needing a manual operation of issuing a registration request command via the input device 20, a new route is registered or added, or an existing registered route is changed automatically, and result data is automatically stored in the storage device 90.

After completion of the exemplary navigation route registration/update method 300, an exemplary traffic condition registration/update method 400 (FIGS. 4 and 7) is performed. First, in step 410 in FIG. 7, traffic congestion data is generated from the travel history data. Specifically, the controller 30 reads the travel history data stored in the storage device 40 and generates traffic congestion data from the travel history data.

If the travel history data stored in the storage device 90 of the information center C is used in the traffic data generation process, the controller 30 transmits a travel history data request via the radio communication device 50. If the server 80 receives the request via the radio communication device 70, the server 80 reads the travel history data from the storage device 90 and transmits the data via the radio communication device 70. The transmitted data is received by the controller 30 via the radio communication device 50 and used in generation of traffic congestion data. The traffic congestion data refers to data indicating a particular point where traffic congestion has occurred on a route described in the travel history data and also indicates the degree of traffic congestion.

Thereafter, in step 420, statistical processing is performed on the traffic congestion data. Specifically, for example, the arithmetic mean of the traffic congestion data may be calculated. In step 430, statistical processing is performed on traffic congestion data in the traffic information. Specifically, for example, the arithmetic mean of traffic congestion data in the traffic information is calculated. In this statistical process in step 430, the controller 30 reads traffic information data stored in the storage device 40 and generates traffic congestion data therefrom. Furthermore, the controller 30 performs the statistical processing on the generated traffic congestion data.

In a case in which the traffic information data stored in the storage device 90 of the information center C is used in the statistical processing, the controller 30 transmits a traffic information data request via the radio communication device 50. If the server 80 receives the request via the radio communication device 70, the server 80 reads the traffic information data from the storage device 90 and transmits the data via the radio communication device 70. If the data is received by the radio communication device 50, the data is supplied to the controller 30. The controller 30 generates traffic congestion data from the received traffic information data. Furthermore, the controller 30 performs the statistical processing on the generated traffic congestion data.

After completion of steps 420 and 430, in step 440, the traffic congestion data generated from the data stored in the storage device 40 is compared with the current traffic congestion data generated from the current traffic information data received from the information center C. If both data are similar to each other, the traffic congestion indicated by the current traffic information data is similar to the current traffic congestion indicated in the travel history data. This means that the traffic condition in terms of congestion on the current route is very similar to the usual condition. In this case, in step 451, a usual congestion data registration process is performed. More specifically, traffic congestion data indicating usual traffic congestion on the route is added to the travel history data and stored in the storage device 40. The traffic congestion data indicating usual traffic congestion is transmitted to the server 80 via the radio communication devices 50 and 70 and stored in the storage device 90 and thus the traffic congestion data is automatically registered as travel history data.

Thus, as described above, without necessitating a manual operation by a user to issue a registration request command via the input device 20, traffic congestion data is automatically registered as traffic information data in the storage devices 40 and 90. Because the registered route data and the traffic information data are registered in both storage devices 40 and 90, the registered route data and the traffic information data may be read from either one of the storage devices 40 and 90. This is very convenient.

In the first exemplary embodiment described above, traffic information data, travel history data, and registered route data are stored in both the storage device 90 of the information center C and the storage device 40 of the navigation system N. Alternatively, traffic information data, travel history data, and registered route data may be stored only in one of the storage device 90 and the storage device 40.

In the case in which traffic information data, travel history data, and registered route data are stored only in the storage device 40, the information center C is unnecessary, and steps 352 and 342 (FIG. 6) are unnecessary. On the other hand, in the case in which traffic information data, travel history data, and registered route data are stored only in the storage device 90, the process of storing data in the storage device 40 in steps 341 and 351 is not necessary.

II. Second Exemplary Embodiment

Figure 10:
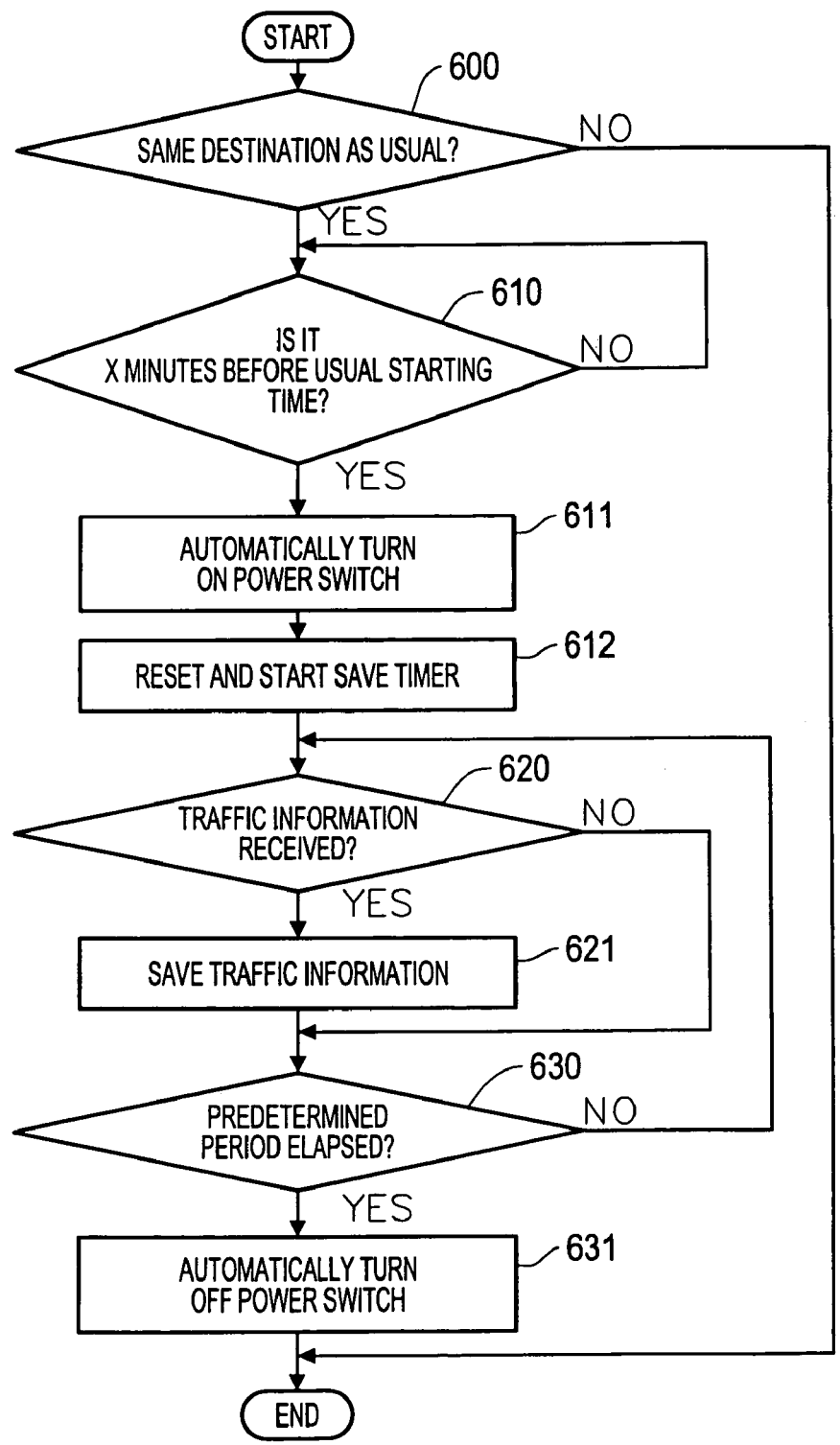
FIG. 10 is a flow chart showing an example of a main part of a method according to a second exemplary embodiment of the invention.

FIG. 10 is a flow chart showing a main part of a method according to a second exemplary embodiment of the invention. In this second embodiment, in addition to the navigation method according to the first exemplary embodiment described above with reference to the flow charts shown in FIGS. 2 and 3, an exemplary traffic information storage interrupt method may be performed in accordance with the flow chart shown in FIG. 10. The same controller 30 as that used in the first exemplary embodiment can perform the exemplary traffic information storage interrupt method and the exemplary traffic information storage interrupt routine may be stored together with the navigation program in the ROM of the controller 30.

In this second exemplary embodiment, each time a predetermined interrupt timeout value (hereinafter referred to as a second interrupt timeout value set in the navigation system) set in another interrupt timer (hereinafter, referred to as a second interrupt timer in the navigation system) is reached, the controller 30 executes the exemplary traffic information storage interrupt method in accordance with the flow chart shown in FIG. 10. The second interrupt timer of the navigation system may be disposed inside the controller 30. This second interrupt timer of the navigation system is reset and starts counting down the second interrupt timeout value set in the navigation system, each time the ignition switch IG is turned off.

In this second exemplary embodiment, in addition to the parts of the first exemplary embodiment, the navigation system N also includes a power switch (not shown in the figures) that automatically turns on and off under the control of the controller 30 such that all parts of the navigation system N other than the controller 30 (already in an active state) are automatically activated when this power switch is turned on, and automatically deactivated when the power switch is turned off. The other parts of the second exemplary embodiment are similar to those of the first exemplary embodiment.

In the second exemplary embodiment constructed in the above-described manner, if the ignition switch IG is turned off, the controller 30 starts execution of the exemplary traffic information storage interrupt method each time a timeout value set in the second interrupt timer of the navigation system expires. In response, in step 600, it is determined whether the current position is a usual destination point, on the basis of, for example, the detection signal output from the current position detector 10. If the car has arrived at the usual destination such as a user's home or user's place of business, an affirmative decision is made in step 600.

Then in step 610, it is determined whether the current time is X minutes (for example, 60 minutes) before a usual starting time, on the basis of, for example, the detection signal output from the current position detector 10. If the current time is not X minutes before the usual starting time, a negative decision is made in step 610. If the current time indicated by the detection signal output from the current position detector 10 becomes X minutes before the usual starting time, the answer to step 610 becomes yes, and the process proceeds to step 611. In step 611, the power switch of the navigation system N is automatically turned on. When the power switch is automatically turned on, all parts of the navigation system N other than the controller 30 (already in the active state) are activated.

In step 612, a storage timer of the controller 30 is reset and started. Thus, the storage timer starts a counting operation. Note that the storage timer may be disposed in the controller 30. In step 620, it is determined whether traffic information is received. If traffic information transmitted from the Vehicle Information and Communication System T is received by the controller 30 via the radio communication device 50, an affirmative decision is made in step 620. In this case, the process proceeds to step 621, and the traffic information is stored. Specifically, the controller 30 stores the traffic information data in the storage device 40.

If the time counted by the storage timer has not yet reached the timeout value, a negative decision is made in step 630, and the process returns to step 620 to repeat a loop from step 620 to step 630. This loop is performed repeatedly until the answer to step 630 becomes affirmative. During the execution of the iteration loop, traffic information transmitted from the Vehicle Information and Communication System T is received by the controller 30 via the radio communication device 50, and the received traffic information data is stored in the storage device 40.

If the timeout value set in the storage timer expires, the answer to the step 630 becomes affirmative, and the process proceeds to step 631. In step 631, the power switch is automatically turned off. As a result, all parts of the navigation system N other than the controller 30 are deactivated.

As described above, before the car starts to run, traffic information transmitted from the Vehicle Information and Communication System T is received and stored as data in the storage device 40 during a period with a length of time specified by the timeout value starting at a time X minutes before the usual starting time at which the car usually starts to run.

Thereafter, as in the first exemplary embodiment, the navigation method is executed when the car starts to run. However, unlike the first exemplary embodiment, the traffic information data stored in the storage device 40 can be used immediately after starting the navigation method without having to wait for arrival of traffic information from the Vehicle Information and Communication System T. Note that other functions and advantages obtained in the first exemplary embodiment may also obtained in this second exemplary embodiment.

III. Third Exemplary Embodiment

Figure 11:
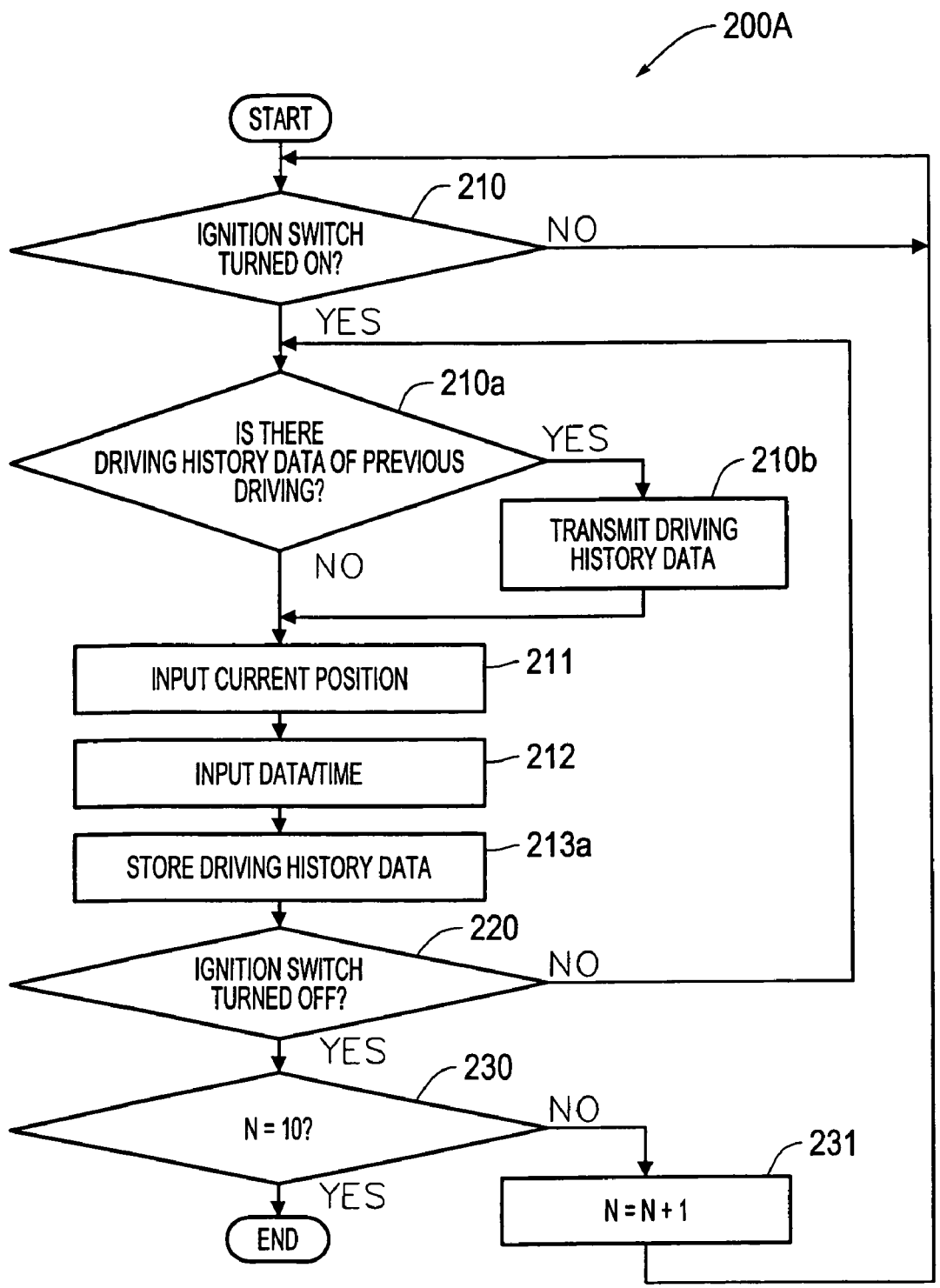
FIG. 11 is a flow chart showing the details of an exemplary data acquisition method that may be executed by a controller to acquire data associated with travel history and traffic information, according to a third exemplary embodiment of the invention.
Figure 12:
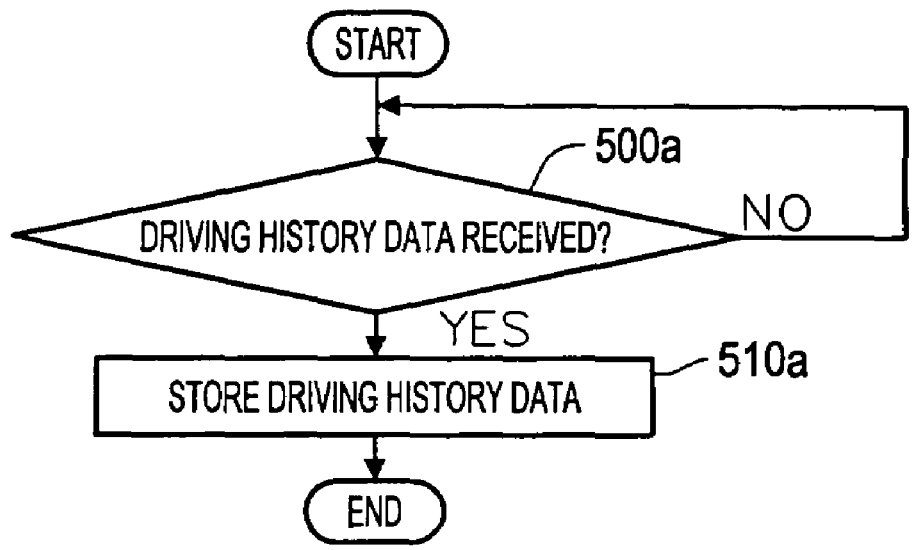
FIG. 12 is a flow chart showing a part of an exemplary server method that may be executed by a server according to the third exemplary embodiment of the invention.
Figure 13:
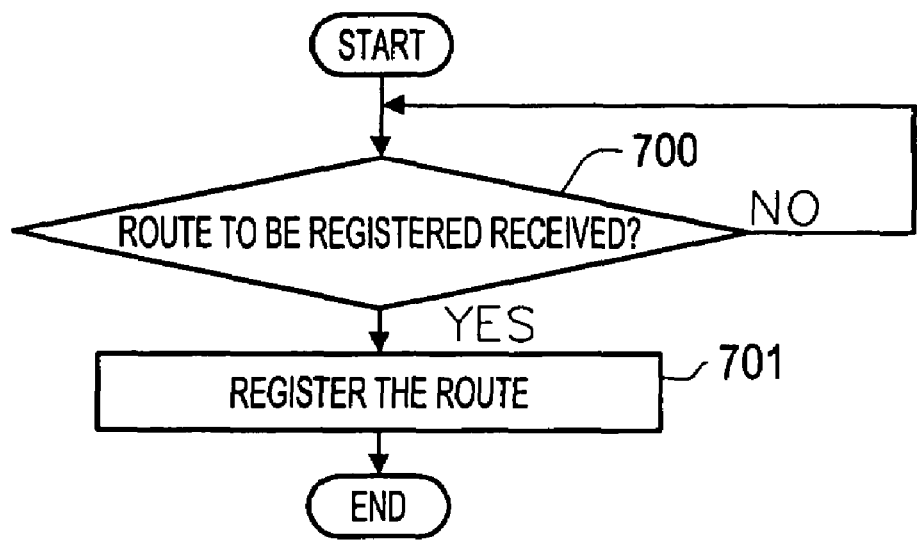
FIG. 13 is a flow chart showing the details of an exemplary registered route reception method that is a part of an interrupt handling method that may be executed by a controller according to the third exemplary embodiment.

FIGS. 11 to 13 show main parts of a method according to a third exemplary embodiment of the invention. In this third exemplary embodiment, the exemplary interrupt handling method that may be executed by the controller 30 according to the first exemplary embodiment is replaced with an exemplary interrupt handling program including a travel history/traffic information data acquisition method 200A (corresponding to the travel history/traffic information data acquisition method 200 shown in FIG. 5) according to the flow chart shown in FIG. 11 and a registered route reception method according to the flow chart shown in FIG. 13.

Figure 6:
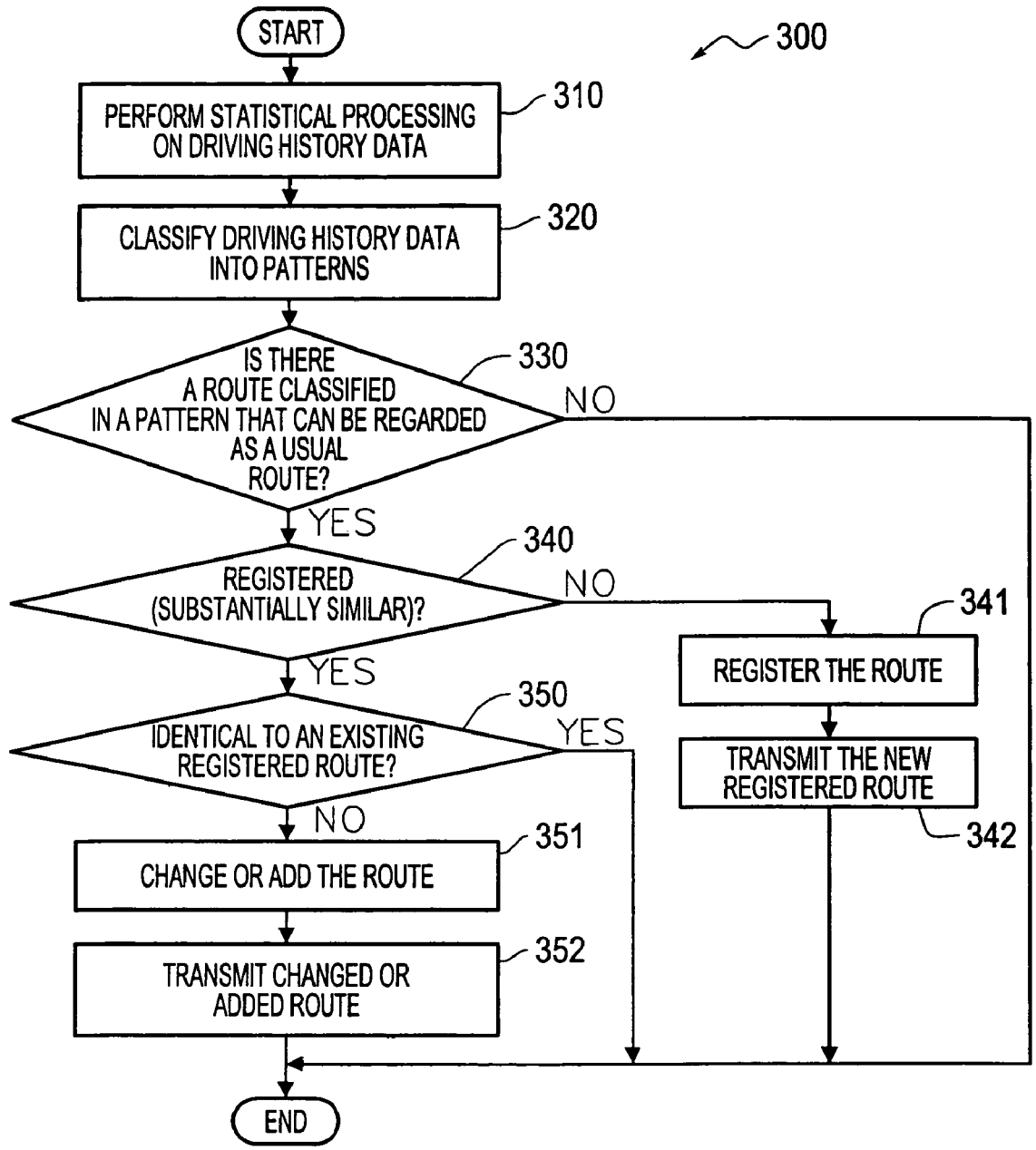
FIG. 6 is a flow chart showing details of the exemplary navigation route registration/update method shown in FIG. 4.
Figure 7:
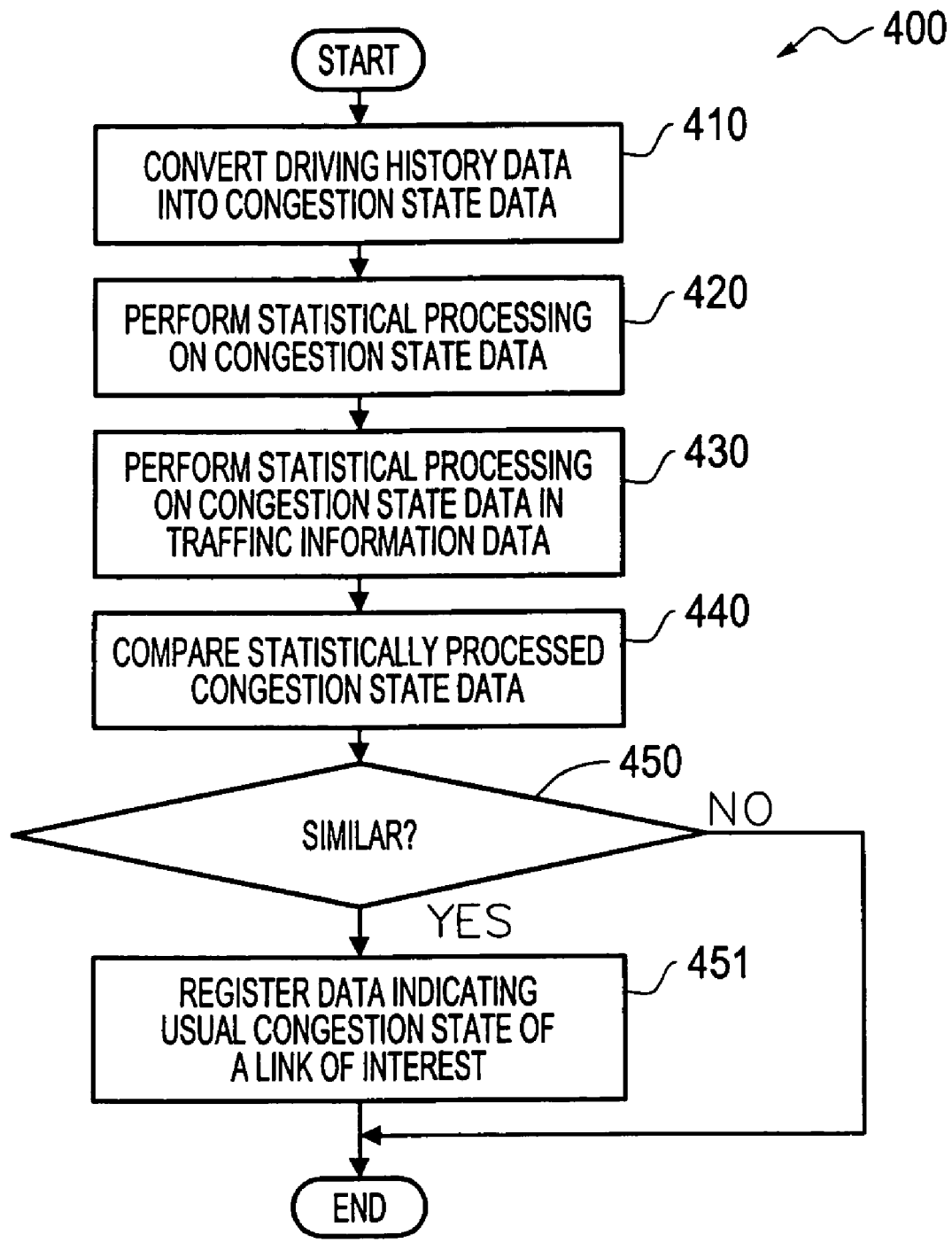
FIG. 7 is a flow chart showing details of the exemplary traffic condition registration/update method shown in FIG. 4.

Furthermore, in this third exemplary embodiment, the exemplary server method that may be executed by the server 80 according to the first exemplary embodiment is replaced with an exemplary method including only the exemplary navigation route registration/update method 300 shown in FIG. 6 and the exemplary traffic information registration/update method 400 shown in FIG. 7, as shown in a flow chart shown in FIG. 12 (corresponding to the flow chart shown in FIG. 8). The other parts of the third exemplary embodiment are similar to those according to the first exemplary embodiment.

In this third exemplary embodiment configured in the above-described manner, when the controller 30 starts execution of the exemplary registration/update method modified from the exemplary interrupt handling method according to the first exemplary embodiment, if the ignition switch IG is turned on and the car starts to run, an affirmative decision is made in step 210 in the travel history/traffic information data acquisition method 200A shown in FIG. 11.

After the affirmative decision is made in step 210, in step 210a, it is determined whether the travel history data associated with a previous travel of the car is stored in the storage device 40. If no travel history data associated with a previous travel is stored in the storage device 40, a negative decision is made in step 210a.

On the other hand, if travel history data associated with the previous travel is stored in the storage device 40, an affirmative decision is made in step 210a, and the process proceeds to step 210b. In step 210b, the travel history data associated with the previous travel is transmitted. Specifically, the controller 30 reads the travel history data associated with the previous travel from the storage device 40 and transmits the travel history data via the radio communication device 50.

Meanwhile, in the information center C, the server 80 executes the exemplary server method according to the flow chart shown in FIG. 12. In this specific situation, a negative decision is made repeatedly in step 500a. If the travel history data associated with the previous travel is transmitted via the radio communication device 50, the travel history data associated with the previous travel is received by the server 80 via the radio communication device 70. As a result, the server 80 makes an affirmative decision in step 500a, and advances the process to step 510a. In step 501a, the travel history data is stored. Specifically, the server 80 may store the received travel history data associated with the previous travel in the storage device 90.

After the affirmative decision is made in step 210a or after the transmission operation in step 210b is completed, in steps 211 and 212, the current position of the car and the current date/time are input to the controller 30 in a similar manner as in steps 211 and 212 of the first exemplary embodiment. Thereafter, in step 213a, the travel history data is stored. More specifically, the travel history of the car as at the current position input in step 211 and as of the date/time input in step 212 is stored as travel history data in the storage device 40.

After completion of step 213a described above, in step 220, it is determined whether the ignition switch IG is turned off. If the ignition switch IG is in the on-state, and thus a negative decision is made in step 220, the process returns to step 211, and a loop from step 211 to step 220 is performed repeatedly until the ignition switch IG is turned off and thus the answer to step 220 becomes affirmative.

In the execution of the above iteration loop, the travel history data associated with the car at a current position varying as the car travels and at a current date/time varying as the car travels are stored, in step 213a, into the storage device 40. Once the travel history data is stored, the answer to step 210a becomes affirmative, and thus in step 210b the travel history data is transmitted via the radio communication device 50. The transmitted travel history data is received by the server 80 via the radio communication device 70. Thus, an affirmative decision is made in step 500a, and in step 510a the travel history data is stored in the storage device 90.

If the car stops and the ignition switch IG is turned off, the answer to step 220 becomes affirmative, and the operation proceeds to step 230. In this specific case, the parameter N=0, and thus a negative decision is made in step 230 and the operation proceeds to step 231. In step 231, the parameter N is incremented such that N=N+1=1. Then the operation returns to step 210. In this specific case, because the ignition switch IG is in the off-state, a negative decision is made repeatedly in step 210.

If the ignition switch IG is again turned on, and the car again starts to run, the answer to step 210 becomes affirmative, and steps 211 to step 220 are performed repeatedly in the above-described manner until the ignition switch IG is turned off. In the execution of the above iteration loop, travel history data associated with the car travel performed after the ignition switch IG is again turned on is stored as travel history data in the storage devices 40 and 90. Thus, the loop from step 210 to step 231 is performed repeatedly until it is determined in step 231 that the parameter N=10. That is, each time the ignition switch IG is turned on, travel history data associated with the car is newly stored in the storage devices 40 and 90.

After completion of the exemplary data acquisition method 200a described above, the exemplary navigation route registration/update method 300 (FIG. 6) is performed. Note that in this third exemplary embodiment, unlike the first exemplary embodiment in which the exemplary navigation route registration/update method 300 is performed by the controller 30, the method 300 may be performed by the server 80. The method 300 is similar to that in the first embodiment except that the method 300 is performed by the server 80.

That is, in the new route registration operation in step 341 and in the registered route change/addition operation in step 351 of the exemplary registration/update method 300, a new registered route or a changed/added route is stored by the server 80 into the storage device 90. In the registered route transmission operation in step 342 and in the change/added route transmission operation in step 352, data associated with a newly registered route or a change/added route is transmitted from the server 80 via the radio communication devices 70 and 50.

After completion of the exemplary data acquisition method 200A described above, if the data associated with the newly registered route or the change/added route is received by the controller 30 via the radio communication device 50, the controller 30 determines in step 700 of the exemplary registered route reception method (FIG. 13) that the data associated with the newly registered route or the change/added route is received. That is, an affirmative decision is made in step 700, and the process proceeds to step 701. In step 701, the route indicated by the received data is registered. That is, the newly registered route or the changed/added route is stored as registered route data into the storage device 40.

After the exemplary registration/update method 300 performed by the server 80 is completed, the exemplary traffic condition registration/update method 400 (FIG. 7) is performed. Note that in this third exemplary embodiment, unlike the first exemplary embodiment in which the exemplary traffic condition registration/update method is performed by the controller 30, this method 400 may be performed by the server 80. This method 400 is similar to that in the first exemplary embodiment except that the method 400 is performed by the server 80 and in that execution order of steps is different as described below. That is, in this third embodiment, in step 451, data indicating typical traffic congestion on a link of interest is automatically stored as travel history data in the storage device 90. Thereafter, the data indicating the typical traffic congestion is transmitted to the controller 30 via the radio communication devices 70 and 50 and automatically stored as travel history data in the storage device 40.

In this third exemplary embodiment, as described above, the exemplary interrupt handling method that is executed by the controller 30 in the first exemplary embodiment is modified such that at least the exemplary navigation route registration/update method 300 and the exemplary traffic condition registration/update method 400 are performed by the server 80 of the information center C. This makes it possible to reduce the processing load imposed on the controller 30 of the navigation system N while achieving functions and advantages similar to those achieved in the first exemplary embodiment.

IV. Fourth Exemplary Embodiment

Figure 14:
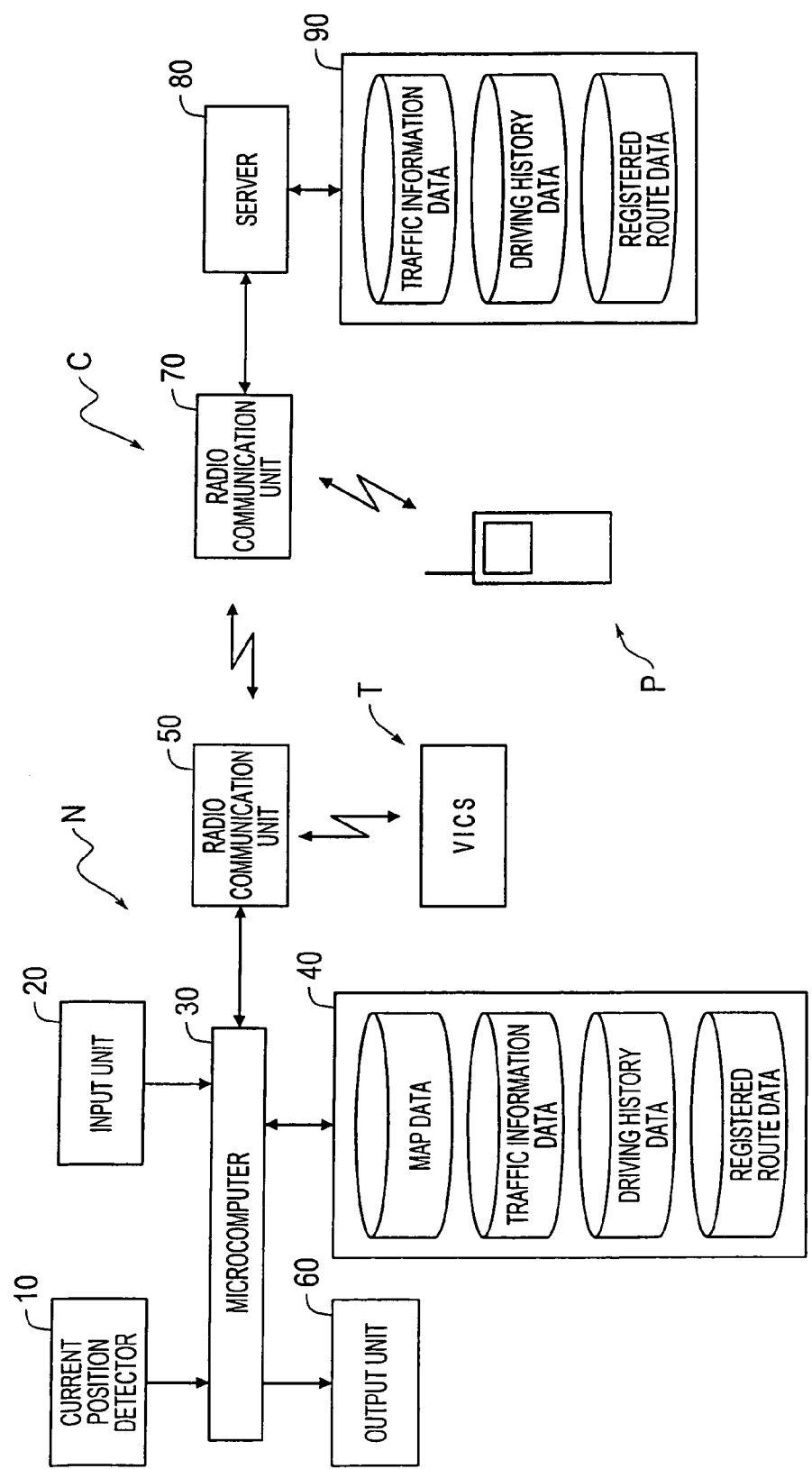
FIG. 14 is a block diagram showing a fourth exemplary embodiment of the invention.
Figure 15:
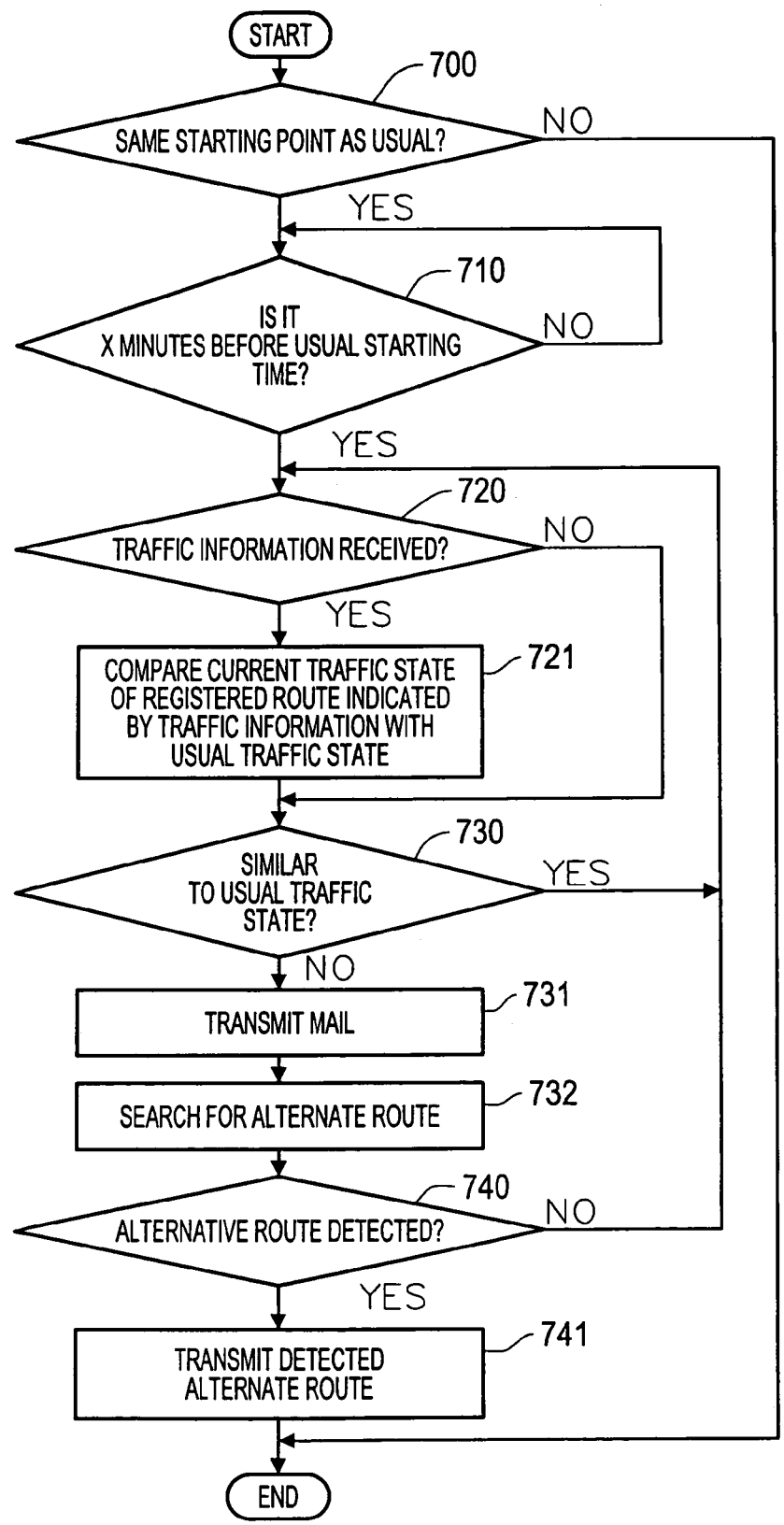
FIG. 15 is a flow chart showing the details of an exemplary interrupt handling method that may be executed by the server at the information center according to the fourth exemplary embodiment of the invention.
Figure 16:
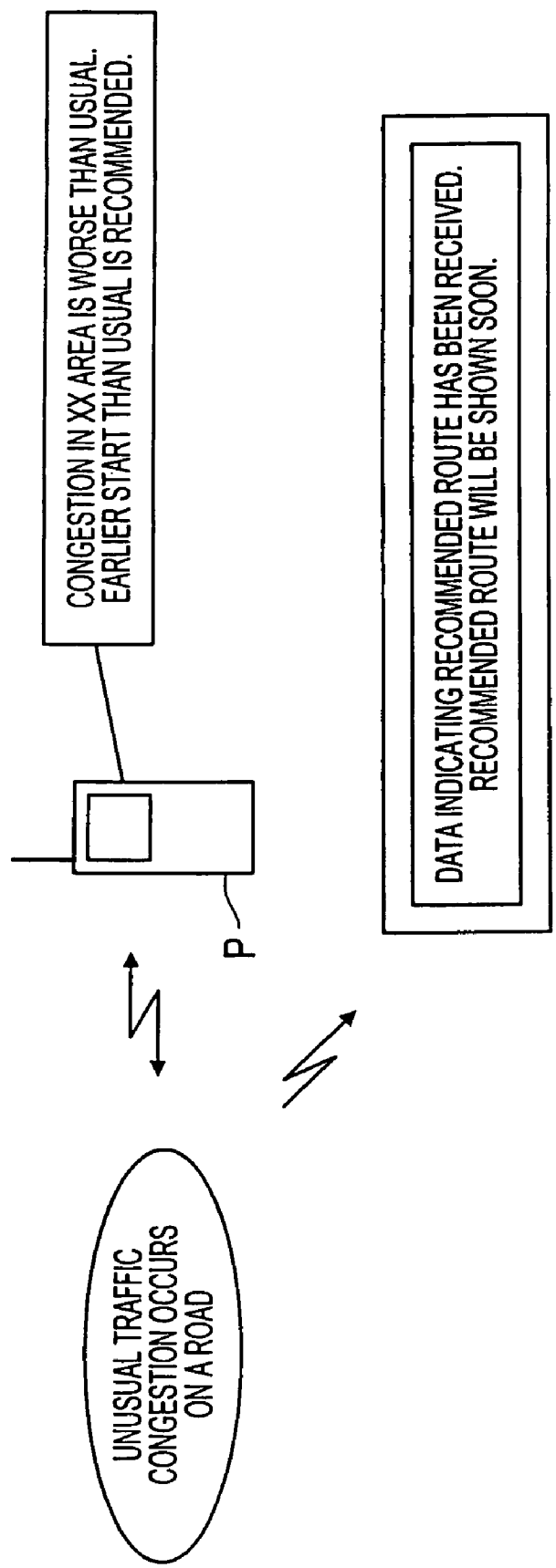
FIG. 16 is a diagram showing examples of messages transmitted among an information center, a portable terminal, and a navigation system.

FIGS. 14 to 16 show a fourth exemplary embodiment of the invention. This fourth exemplary embodiment is similar in configuration to the third exemplary embodiment except that the fourth exemplary embodiment additionally includes a portable terminal P that may be used for radio communication with the radio communication device 70 of the information center C.

In the fourth exemplary embodiment, in addition to the exemplary server method described in the third exemplary embodiment, an exemplary interrupt handling method (hereinafter, referred to as an exemplary interrupt handling method executed in the information center) is also executed by the server 80 described in the third exemplary embodiment in accordance with a flow chart shown in FIG. 15 in response to an interrupt that occurs each time a predetermined interrupt timeout value (also referred to as an interrupt timeout value set in the information center) set in an interrupt timer (also referred to as an interrupt timer disposed in the information center) expires. The interrupt handling method may be stored together with the server method as programs in the ROM of the server 80.

The interrupt timer in the information center is disposed in the server 80. Each time the server 80 receives a signal indicating that the ignition switch IG is turned off from the controller 30 of the navigation system N via the radio communication devices 50 and 70, the interrupt timer in the information center is restarted to count down the interrupt timeout value set in the information center. The other parts are similar to that of the third exemplary embodiment.

In the fourth exemplary embodiment, as in the third exemplary embodiment described above, each time the ignition switch IG is turned off, a signal indicating that the ignition switch IG is turned off is transmitted from the controller 30 of the navigation system N to the server 80 via the radio communication devices 50 and 70. In response, the interrupt timer in the information center is reset each time the ignition switch IG is turned off, and the interrupt timer in the information center starts to count down the interrupt timeout value set in the information center.

Each time the interrupt timeout value set in the interrupt timer in the information center is reached, the server 80 starts to execute the exemplary interrupt handling method in the information center in accordance with a flow chart shown in FIG. 15. In step 700 of the exemplary interrupt handling method, it is determined whether the current position is a usual starting point on the basis of the detection signal output from, for example, the current position detector 10. As in step 600 in the second exemplary embodiment, if the car is at a usual destination such as a user's home or user's place of business, the answer to step 700 is affirmative.

Then in step 710, as in step 610 in the second exemplary embodiment, it is determined whether the current time is X minutes before a usual starting time, on the basis of, for example, the detection signal output from the current position detector 10. If the answer to step 710 is affirmative, the process proceeds to step 720. In step 720, it is determined whether traffic information is received. If traffic information transmitted from the Vehicle Information and Communication System T is received by the sever 80 via the radio communication device 70 and the radio communication device 50, it is determined in step 720 that traffic information is received, that is, an affirmative decision is made in step 720.

Thereafter, in step 721, the current traffic condition on the registered usual route indicated by the traffic information is compared with the typical traffic condition. More specifically, in this comparison operation, the server 80 reads, from the storage device 90, traffic information data indicating typical traffic condition on the registered usual route and compares it with traffic information acquired from the Vehicle Information and Communication System T.

If the comparison indicates that the traffic information acquired from the Vehicle Information and Communication System T is unusually different from the typical traffic condition on the registered usual route indicated by the traffic information data, a negative decision is made in step 730 and the operation proceeds to step 731. In step 731, a main transmission process is performed. More specifically, as shown by way of example in FIG. 16, an e-mail message "Traffic congestion is detected in an area XX. It is recommended that you should start earlier than usual." is transmitted, as congestion information indicating that unusual traffic congestion is detected, from the server 80 to the portable terminal P via the radio communication device 70. Thus, via the e-mail received by the portable terminal P, a user is informed of unusual traffic congestion before he/she gets in his/her car, and the user can start to travel earlier than usual. This is very convenient for the user.

After completion of step 731, in step 732, an alternative route searching operation in performed. In this alternative route searching operation, the server 80 searches the registered route data in the database stored in the storage device 90 for an alternative route from the starting point to the destination.

If an alternative route is found in the searching operation, an affirmative decision is made in step 740, and the process proceeds to step 741. In step 741, a new route transmission operation is performed. Specifically, data indicating the detected alternative route as a new recommended route is transmitted from the server 80 via the radio communication device 70.

When the car starts to run, if the controller 30 of the navigation system N receives via the radio communication device 50 the data indicating the new route transmitted from the radio communication device 70, the controller 30 displays on the output device 60 the received data together with a message indicating that data indicating a recommended route has been received, and navigation is going to be performed along the recommended route. Displaying the message and the new route on the output device 60 makes it possible for the user to drive the car to the destination along the displayed new route without encountering traffic congestion occurring on the usual route.

In the present invention, for example, Traffic Message Channel used in Europe may be used instead of the Vehicle Information and Communication System T. In the present invention, the output device 60 is not limited to a display, but another type of output device such as an output device using voice synthesizer may also be used.

While various features of this invention have been described in conjunction with the exemplary embodiments outlined above, various alternatives, modifications, variations, and/or improvements of those features may be possible. Accordingly, the exemplary embodiments of the invention, as set forth above, are intended to be illustrative. Various may be made without departing from the spirit and scope of the invention.

What is claimed is:

1. A traffic information notification system for use by a vehicle comprising:
   a controller that:
   acquires vehicle travel history data;
   automatically registers, on the basis of the acquired travel history data, at least one route along which the vehicle usually travels, a time at which the vehicle travels along each of the at least one routes, and traffic information associated with each of the at least one routes, the automatically registered traffic information comprising a location of historic traffic congestion and a degree of the historic traffic congestion;
   compares current traffic information along a registered route to be traveled provided by a traffic information system with the automatically registered traffic information for that registered route to be traveled, the current traffic information comprising a location of current traffic congestion and a degree of the current traffic congestion; and
   when the current traffic information is substantially different from the automatically registered traffic information, provides a notification of the substantially different current traffic information provided by the traffic information system.

2. The traffic information notification system of claim 1, wherein the controller provides a notification of the substantially different current traffic information together with a point on the registered route to be traveled at which an unusual traffic condition indicated by the current traffic information occurs.

3. The traffic information notification system of claim 1, wherein if the current traffic information is substantially different from the automatically registered traffic information, the controller searches for an alternative route different from the registered route.

4. A car navigation system comprising:
   the traffic information notification system of claim 3;
   wherein the controller provides route guidance along the searched for alternative route.

5. The traffic information notification system of claim 1, further comprising:
   a memory that stores, when the vehicle is located at a usual starting point, the current traffic information provided by the traffic information system, during a predetermined period before a usual starting time.

6. A traffic information notification system for use by a vehicle comprising:
   a transmitter, disposed separately from the vehicle;
   a first controller, disposed on the vehicle, that:
   acquires vehicle travel history data;
   receives registered route data that is transmitted from the transmitter disposed separately from the vehicle, the registered route data including data indicating a time at which the vehicle travels along the route, and usual traffic information on the route, the usual traffic information comprising a location of usual traffic congestion and a degree of the usual traffic congestion; and
   when current traffic information provided by a traffic information system is substantially different from the usual traffic information, provides a notification of the substantially different traffic information together with data indicating a point on the registered route at which an unusual traffic condition indicated by the substantially different traffic information occurs, the current traffic information comprising a location of current traffic congestion and a degree of the current traffic congestion; and a second controller, disposed separately from the vehicle, that receives the travel history data, the travel history data being sequentially transmitted from the first controller.

7. The traffic information notification system of claim 6, wherein the second controller automatically registers, on the basis of the received travel history data, at least one route along which the vehicle usually travels, a time at which the vehicle travels along each of the at least one routes, and traffic information associated with each of the at least one routes.

8. The traffic information notification system of claim 7, further comprising:

a portable terminal;

wherein, if the vehicle is at a usual destination point and the provided current traffic information is substantially different from the usual traffic information, the second controller notifies the portable terminal, of the substantially different stored traffic information together with data indicating a point on the registered route at which an unusual traffic condition indicated by the stored substantially different traffic information occurs.

9. The traffic information notification system of claim 8, wherein:

the second controller searches for an alternative route different from the registered route; and when an alternative route is detected, the transmitter transmits data indicating the alternative route to the first controller.

10. A car navigation system comprising:

the traffic information notification system of claim 9;

wherein the first controller provides route guidance along the alternative route.

11. The traffic information notification system of claim 6, further comprising:

a memory, disposed on the vehicle, that stores, when the vehicle is located at a usual starting point, the current traffic information provided by the traffic information system, during a predetermined period before a usual starting time.

12. A method for providing traffic notification, comprising:

acquiring vehicle travel history data;

automatically registering, on the basis of the acquired travel history data, at least one route along which the vehicle usually travels, a time at which the vehicle travels along each of the at least one routes, and traffic information associated with each of the at least one routes, the automatically registered traffic information comprising a location of historic traffic congestion and a degree of the historic traffic congestion;

comparing current traffic information along a registered route to he traveled provided by a traffic information system with the automatically registered traffic information for that registered route to be traveled, the current traffic information comprising a location of current traffic congestion and a degree of the current traffic congestion; and when the current traffic information is substantially different from the automatically registered traffic information, providing a notification of the substantially different current traffic information provided by the traffic information system.

13. The method of claim 12, wherein providing a notification further comprises providing a notification of the substantially different current traffic information together with a point on the registered route to be traveled at which an unusual traffic condition indicated by the current traffic information occurs.

14. A method for searching for a route based on a traffic notification, comprising:

providing traffic notification according to the method of claim 12; and searching for, in response to the notification of the substantially different current traffic information, an alternative route different from the registered route.

15. A method for providing guidance based on a traffic notification, comprising:

searching for a route according to the method of claim 14; and providing guidance along the alternative route.

16. A storage medium storing a set of program instructions executable on a data processing device and usable for providing traffic notification, the set of program instructions comprising:

instructions for acquiring vehicle travel history data;

instructions for automatically registering, on the basis of the acquired travel history data, at least one route along which the vehicle usually travels, a time at which the vehicle travels along each of the at least one routes, and traffic information associated with each of the at least one routes, the automatically registered traffic information comprising a location of historic traffic congestion and a degree of the historic traffic congestion;

instructions for comparing current traffic information along a registered route to be traveled provided by a traffic information system with the automatically registered traffic information for that registered route to be traveled, the current traffic information comprising a location of current traffic congestion and a degree of the current traffic congestion; and instructions for providing a notification, when the current traffic information is substantially different from the automatically registered traffic information, of the substantially different current traffic information provided by the traffic information system.

* * * * *